May 22, 1951 L. F. LANGHURST 2,554,109
SOLVENT EXTRACTOR
Filed March 5, 1947 3 Sheets-Sheet 1

INVENTOR
LOUIS F. LANGHURST
BY Hyde, Meyer, Beldwin & Doran
ATTORNEYS

May 22, 1951 — L. F. LANGHURST — 2,554,109
SOLVENT EXTRACTOR

Filed March 5, 1947 — 3 Sheets-Sheet 2

INVENTOR
LOUIS F. LANGHURST
BY Hyde, Meyer, Baldwin & Doran
ATTORNEYS

Patented May 22, 1951

2,554,109

UNITED STATES PATENT OFFICE 2,554,109

SOLVENT EXTRACTOR

Louis F. Langhurst, Cleveland, Ohio, assignor to The V. D. Anderson Company, Cleveland, Ohio, a corporation of Ohio Application March 5, 1947, Serial No. 732,603

4 Claims. (Cl. 23—270)

This invention relates to the extraction of oil and fat from solid materials containing the same by the use of a volatile solvent. While capable of use with any oil-bearing material, either vegetable, such as soybeans, flaxseed, cottonseed or the like, or animal material, such as meat, bones and fat, and by means of any of the well-known solvents, for purposes of illustration, and in no sense of limitation the invention will be described with reference to a plant or system employing hexane in the recovery of oil or fat from animal matter.

One object of the invention is to generally simplify and improve the invention of my prior application for Solvent Recovery System, Serial Number 551,243, filed August 25, 1944, now Patent No. 2,467,435, by the use of parts or units so closely organized and related to each other as to materially reduce piping and travel of material from one place to another in the system, thus reducing cost and over-all bulk of the apparatus, saving heat, and securing more efficient results in practice.

Another object is to simplify the moving operating mechanism by the employment of special forms of extractor and drier jointly operated by the same shaft, together with other parts driven by the same shaft, thus reducing power costs and providing long life of the apparatus in service.

Still another object is to combine the several units in such manner as to avoid carrying dust into the condenser and thus preventing clogging of its passages and maintaining high efficiency not only in the condenser but elsewhere.

Still another object is to provide a system of this kind in which, during extraction, the solid material and solvent liquid travel contrariwise, according to countercurrent principles, with the solid material advancing step by step, at intervals, through a series of compartments, in each one of which extraction goes on continuously.

Further objects of the invention in part are obvious and in part will appear more in detail hereinafter.

In the drawings, which represent one suitable embodiment of the invention,

Figure 1:
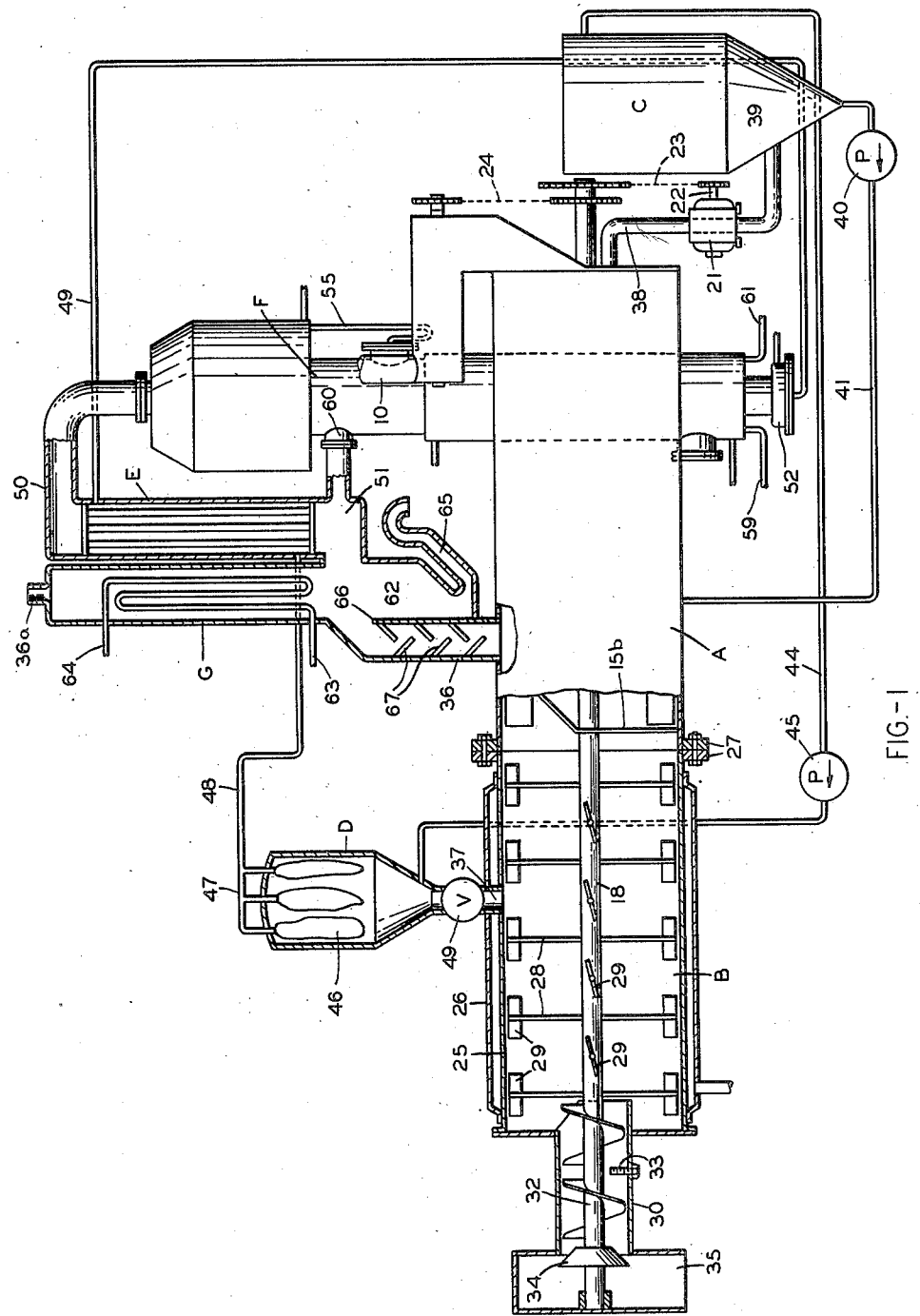
Fig. 1 is a diagram, schematically showing the entire system, with certain parts in sectional elevation.
Figure 2:
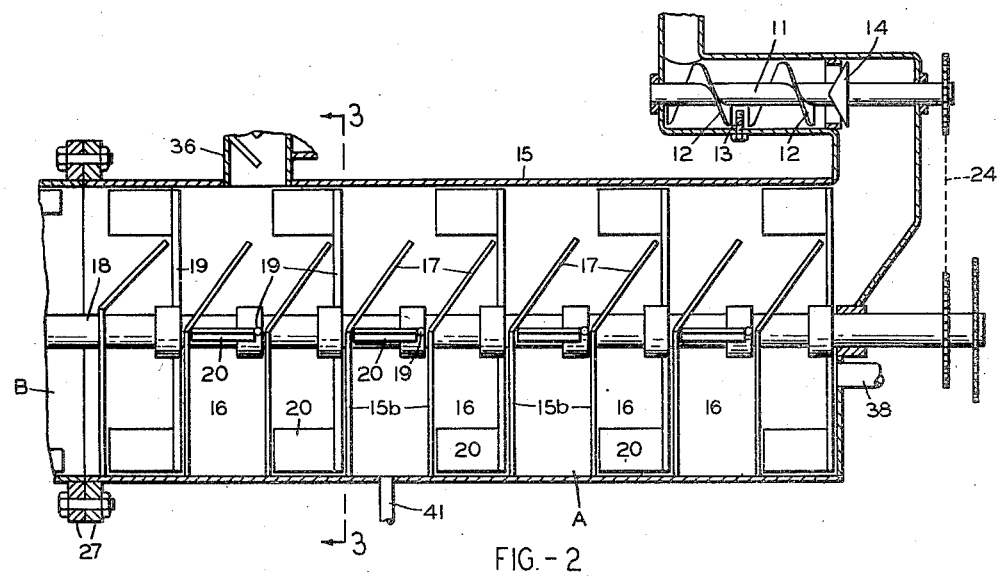
Fig. 2 is a detail sectional elevation, on a larger scale, through the extractor.

The present system arose from the desire for oil extracting apparatus of relatively small capacity, as compared to that of my prior application before referred to, one adapted for use by packing houses or other plants handling meat, bones and animal offal of lesser bulk than the larger quantities of materials for which the prior plant is particularly suitable. As a result, the present system is very compact and of low overall bulk.

It comprises an extractor A, in which the solid material is subjected to extraction with the liquid solvent, a drier B for the solid material, a settling device or fines separator C, sometimes a filter D, a preheater E, a distillation unit or calandria F, and a condenser G, all interconnected and associated with each other for cooperation to a common end.

The material to be treated, here assumed to be animal matter, is first cooked and comminuted to free the oil for extraction. Bones are finely crushed or ground and meat and other soft tissues are macerated so that the whole is a pulpy mass. Such material, water free so far as conveniently possible, is supplied continuously to a feed conduit 10 equipped with valve control, such as a conventional worm screw conveyor 11 with individual flights 12 separated by knives 13 which prevent bodily rotation of the mass, which conveyor advances the mass under pressure past a yielding choke 14 and discharges it into the supply opening to extractor A.

The extractor A

This may be of any form suitable for the purpose, but is shown as a long tank 15 of cylindrical form, mounted with its axis horizontally disposed, and provided with cross partitions 15b forming a series of chambers or compartments 16, each partition having an inclined shelf 17 along its upper edge. Within the tank is a longitudinal shaft 18 provided with radial arms 19 each supporting a scoop or bucket 20, usually two for each compartment. These are spaced circumferentially and longitudinally of the shaft to balance the load. Shaft 18 is rotated slowly by any suitable driving means, such as an electric motor 21, the shaft 22 of which is connected by sprocket chain 23 to shaft 18. Shaft 18 drives the shaft of worm 11 by sprocket chain 24.

As the shaft rotates, the arms 19 and buckets 20 serve as agitators, to stir up the mass and promote extraction, and also as conveying means. Each bucket picks up a load and carries it up out of the liquid and dumps the load upon an inclined shelf 17, down which it slides into the next compartment. Thus shaft rotation causes continuous advance of the solid material through and along the extracting tank, from right to left in Fig. 1.

Figure 3:
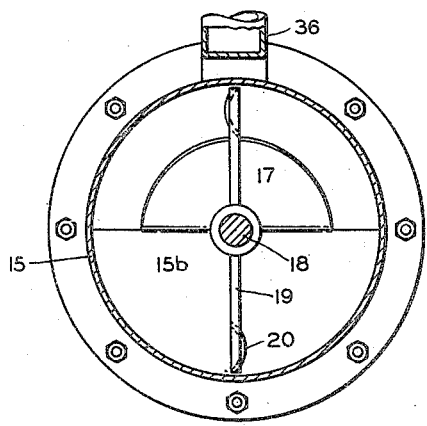
Fig. 3 is a cross section, on the line 3—3, Fig. 2.
Figure 5:
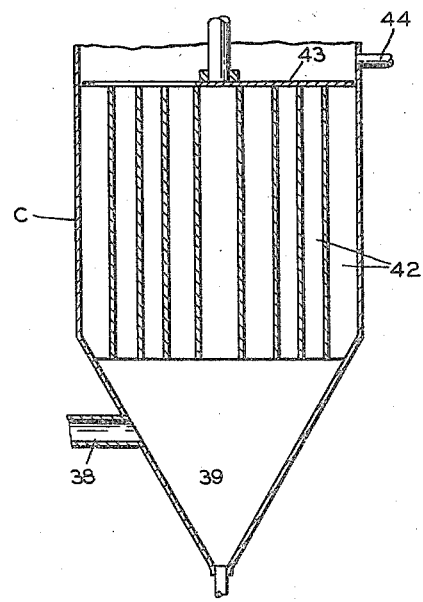
Fig. 5 is a similar section through the settling device or fines separator.
Figure 4:
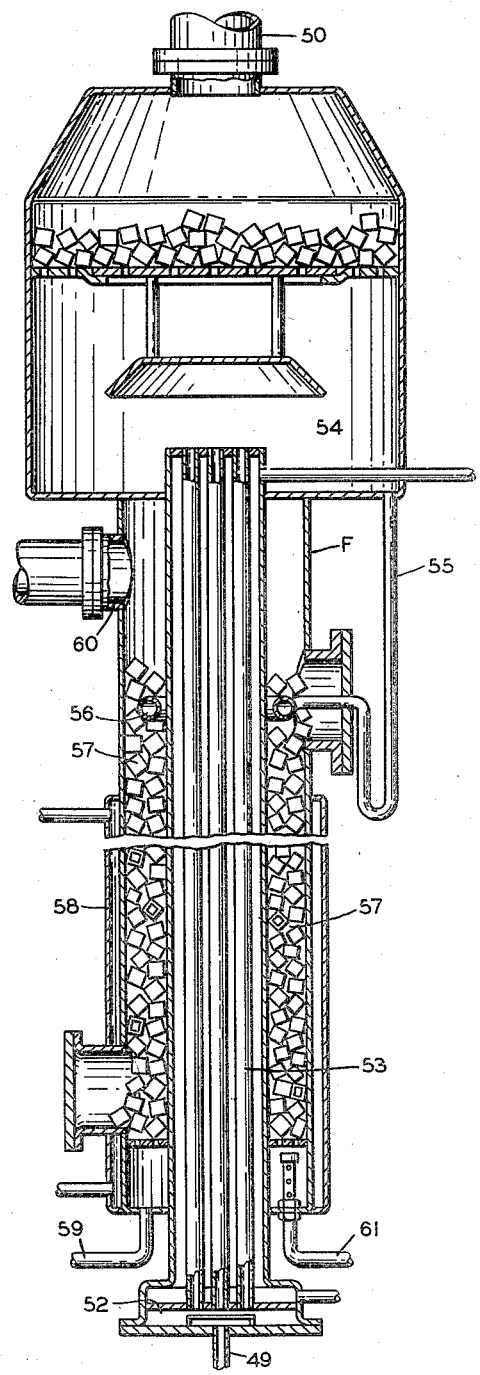
Fig. 4 is a sectional elevation through the distillation unit or calandria.

While this is going on the extracting solvent liquid, such as hexane, is caused to flow in the opposite direction, or from left to right in Fig. 1. It enters the last compartment at the left end of extractor A and fills it and then flows over the partition into the next compartment, and so on, discharging at the right end of extractor A as miscella, a mixture of hexane and the oil or fat dissolved therein, together with some small or fine fragments of the solid material. As shown in Fig. 3 the inclined shelves 17 at their ends stop short of the wall of the extractor, leaving the end portions of each partition 15b free and open. Consequently a level of liquid is maintained in the extractor at about the level of the operating shaft. What happens to the liquid stream discharged from the extractor will be described later.

The drier B

This includes a cylindrical tank 25 of approximately the same dimensions as the tank of extractor A. Usually the two tanks are provided with end flanges 27, by means of which they may be removably bolted together, for ease of assembly, and for separation in case necessity arises for repair or inspection. Shaft 18 extends through the drier, in which it is provided with radial arms 28 carrying paddles 29 traveling fairly close to the wall of the tank so as to not only agitate and lift the material but also to advance it endwise to the left toward the discharge outlet. For this purpose the agitating paddles 29 may be inclined spirally of the axis, as is usual.

The far end of the drier is closed, except for the outlet conduit 30, which extends into the end of the drier in the form of a trough into which the final paddles lift the solid material, if the mass thereof does not reach the level of the discharge outlet and thus overflow into the trough. Within the discharge conduit is a worm screw conveyor 32, having individual flights separated by knives 33 and working against a yielding choke 34, just as in the inlet conduit for the extractor. Here, as there, the material is advanced under pressure, as a more or less solid and compact mass, discharging past the choke into a discharge pipe 35 from which it issues to a pile or to any suitable container.

In the drier the material is dried to a form suitable for handling in bulk when cold. The drying process drives off steam and vapors, including the last traces of the solvent liquid, hexane. All such gaseous products, as well as fine dust traveling with them, discharge into a passage 36 leading to the condenser G having an outlet 36a to atmosphere.

Upon the drier is mounted a filter D, later to be referred to more in detail, but from the outlet conduit 37 of which solid material collected in the filter may be discharged directly to the drier to be mingled with that being dried therein.

The fines separator C

The stream of liquid, in the form of miscella, discharged from the right-hand end of the extractor, Fig. 1, is conducted by pipe 38 to the fines separator C. This separator may be any form of device suitable for the purpose, usually separating the fine solid material from the liquid stream by gravity, as the result of differences in density. The drawings show, for purposes of illustration, a fines separator of the same form illustrated and described and claimed in my application for Method and Apparatus for Separating Prepared Oil-Bearing Seed Oil and Solvent Mixture, Serial Number 551,244, filed August 25, 1944, now abandoned, to which reference may be had for a more complete description thereof, if desirable or necessary. It is sufficient here to say that the fines separator includes a hopper bottom 39, to the upper end portion of which the liquid to be settled is supplied, and from the lower end of which the collected solid material may be withdrawn and disposed of as may be desired. As illustrated the discharge end of the hopper communicates with a pump 40 discharging to a conduit 41 communicating with one of the chambers or compartments within extractor A. Thus solid material collected in the fines separator may be discharged, either continuously and slowly, so as not to interfere with the settling process, or at regular intervals, to the extractor, where it is mingled with the original mass and undergoes new treatment.

The upper portion of the settling device is divided into a large number of small passages 42 controlled by valve mechanism, marked generally 43, at their upper ends. The arrangement is such that only a few of the passages 42 are open at any one time, for flow therein, but all of the passages are made active serially and in order by operation of the valve mechanism. The settled liquid discharged from the upper end of passages 42 is conducted by pipe 44 and pump 45 (if one is necessary) to the lower end of the filter D.

The filter D

This, also, may be of any suitable form and is shown more or less conventionally as a hopper bottom tank in which are suspended a series of filter stockings 46, the spaces within which communicate with a manifold 47 connected to pipe 48.

From time to time, the deposits on the filter stockings are removed and permitted to collect in the hopper bottom of the filter, which is provided with the discharge conduit 37 before referred to. In this conduit is a valve 49 by opening which the solid material collected in the filter may be discharged into the drier to join the material there undergoing treatment.

The preheater E

The filtered miscella discharged from the filter is conducted by pipe 48 to and through preheater E. This, also, is shown conventionally. It may be of the same form shown in my prior application for Solvent Recovery System, Serial Number 551,243 before referred to, to which reference may be had for a more complete description, if desirable or necessary. The preheater, generally speaking, is like a water tube or fire tube boiler, including a series of tubes providing two sets of passages. Through one set of passages the filtered miscella flows from conduit 48 to the discharge conduit 49. Through the other set of passages hot vapors are introduced from a conduit 50, later to be referred to, coming from the distillation unit. These hot vapors are discharged from the preheater to a passage 51 communicating with the passage 36 from the extractor before referred to, both thereof opening into the bottom of the condenser G.

In the preheater some heat which otherwise might be lost and thus wasted is transferred to the stream of filtered miscella to raise its temperature and reduce the cost of distillation.

The distillation unit F

This unit, also, is of the same form described and shown in my said prior application for Solvent Recovery System, Serial Number 551,243, and is thus illustrated more or less conventionally. The filtered miscella leaving the preheater flows by way of conduit 49 to a supply chamber 52 at the bottom of the calandria, flowing upwardly therein through tubes 53 to an upper chamber 54 in which all of the oil collects, and most of the solvent is vaporized. The vapors and gas are discharged from the upper end and through the conduit 50 before referred to.

Liquid collecting in chamber 54 flows downwardly, through trapped pipe 55 to a hollow ring 56, provided with a large number of small openings, so as to spray the liquid into annular chamber 57, heated by steam jacket 58. Oil flowing downwardly in chamber 57, and from which all traces of solvent liquid have been stripped is discharged by way of conduit 59 and conducted to an oil collecting receiver not shown.

The vapors formed or rising in chamber 57 are conducted by pipe 60 to the same passage 51 before referred to. Chamber 57 may contain a number of Raschig tubes, which are hollow ferrules or tube fragments providing a large surface area over which the oil containing a small amount of solvent flows downward in counterflow relation to the stripping steam flowing up. Solvent free oil then flows out of the chamber bottom thru pipe 59.

Stripping steam is supplied to chamber 57, as by pipe 61.

The condenser G

The distillation unit F is in the form of a tall column standing upright fairly close to and alongside the extractor. As shown in Fig. 1 the preheater E and condenser G are also upright and may be located alongside of the distillation unit and thus quite close to the extractor. Indeed, the condenser G may be located directly over the extractor, so that liquid collecting in the condenser and draining to its bottom may fall by gravity into a collecting tank 62, directly over the extractor or close to it.

The condenser may be provided with any suitable cooling means, such as coils supplied with cold water by way of pipes 63, 64. Around these pipes flows all vapors and gases produced in the system and containing either non-condensibles, such as air, or any portion of the solvent liquid or water. All such gaseous products join at the bottom of the condenser, where passages 36 and 51 open into it and flow upwardly through the condenser to the vent outlet 38. Thus, receptacle 62 collects a mixture of water and solvent liquid. The water is the heavier and flows to the bottom, being discharged through gooseneck pipe 65, rising above the level of the sewer or other outlet. The solvent liquid flows over the wall 66 of the collecting vessel and travels down along baffle shelves 67 in passage 36 in the form of a curtain of small streams or drops which curtain serves as a screen to entrain, catch and collect any fine particles of dust which are produced within the drier and which are so light as to travel with the stream of gaseous products issuing therefrom. Thus, this liquid curtain forms a trap which prevents fine particles of solid material from reaching the condenser and collecting in its passages or on its surfaces and thus clogging it and reducing its efficiency.

The system described is of unusually simple form, particularly in the association and relation of various members of the unit to each other in such manner as to reduce to a minimum the amount and cost of piping and conduits. Several units of the apparatus communicate directly with each other, instead of being separated remotely with the necessity not only of connecting them by pipes but of also providing flow producing pumps and other apparatus necessary for proper operation. Thus, a system of this kind, especially when made in the smaller sizes, is useful where the material handled is of relatively small bulk, and can be made and sold at a price low enough to justify a system for the purpose. The operations are performed at relatively low cost and quite efficiently, with recovery equal to or better than other prior systems for the purpose.

Other advantages of the invention will be apparent to those skilled in the art.

What I claim is:

1. In an apparatus for extracting oil from solid, oil-bearing material, an extractor chamber of generally tubular character and horizontally disposed, a drier chamber also of generally tubular character adjacent to and coaxial with said extractor chamber, a vertical partition between said chambers extending upwardly to approximately the common cylindrical axis thereof whereby to prevent liquid flow from said extractor chamber to said drier chamber below said axis, liquid inlet means to said extractor chamber and liquid outlet means therefrom, said inlet and outlet means being below the level of the top of said partition whereby to respectively admit solvent liquid to said extractor chamber and discharge oil-solvent solution therefrom, means for elevating solid solvent-treated material from said extractor chamber and discharging it above and across said partition into said drier chamber, a filter chamber above said drier chamber, a solid transfer passage extending downwardly from said filter chamber to said drier chamber, valve means in said passage for controlling downward discharge of material from said filter chamber to said drier chamber, a first pipe means for conveying the aforesaid oil-solvent solution from the aforesaid outlet means from said extractor chamber to the lower end of said filter chamber, a second pipe means for discharging filtered oil-solvent mixture from said filter chamber, and filter means in said filter chamber between said first and second pipe means.

2. Oil extraction apparatus as defined in claim 1, and wherein said first pipe means is divided to include therein a settling chamber, means in said chamber for retarding liquid flow to permit solid material to settle to the lower portion of said chamber.

3. Oil extraction means as defined in claim 1, and further provided with a condenser unit fixed above said extractor chamber, open conduit means extending upwardly from said extractor chamber to said condenser unit whereby to permit upward flow of solvent vapor from said extractor chamber to said condenser unit and downward fall of condensed solvent liquid from said condenser unit to said extractor chamber.

4. Oil extraction apparatus as defined in claim 3 and wherein said open conduit means is provided therein with a vertically spaced series of inclined baffle plates extending inwardly alternately from opposite inner walls of said open conduit, to intercept liquid dropping in said open conduit and provide a splashed spray curtain whereby to entrain fine solid particles being carried upwardly by the aforesaid solvent vapor arising in said open conduit, and carry said particles back into said extractor chamber.

LOUIS F. LANGHURST.

REFERENCES CITED

The following references are of record in the file of this patent:

UNITED STATES PATENTS

| Number | Name | Date |
|---|---|---|
| 608,554 | Moodie | Aug. 2, 1898 |
| 756,271 | Naef | Apr. 5, 1904 |
| 1,084,980 | Trump | Jan. 20, 1914 |
| 2,152,664 | Rosenthal | Apr. 4, 1939 |
| 2,238,690 | Fell | Apr. 15, 1941 |
| 2,264,390 | Levine et al. | Dec. 2, 1944 |
| 2,377,136 | Dinley | May 29, 1945 |
| 2,447,845 | Dinley | Aug. 24, 1948 |